US012797650B2

(12) United States Patent
Jorge et al.

(10) Patent No.: US 12,797,650 B2
(45) Date of Patent: Nov. 17, 2026

(54) DISPOSABLE, FLAT-FOLD RESPIRATOR HAVING INCREASED STIFFNESS IN SELECTED AREAS

(71) Applicant: 3M INNOVATIVE PROPERTIES COMPANY, St. Paul, MN (US)

(72) Inventors: Andre de Carvalho Jorge, Dusseldorf (DE); Dean Wright, Chilton (GB); Bongyeol Yeom, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 277 days.

(21) Appl. No.: 18/482,175

(22) Filed: Oct. 6, 2023

(65) Prior Publication Data

US 2024/0115889 A1 Apr. 11, 2024

Related U.S. Application Data

(60) Provisional application No. 63/378,702, filed on Oct. 7, 2022.

(51) Int. Cl.
*A41D 13/11* (2006.01)
*A62B 18/02* (2006.01)

(52) U.S. Cl.
CPC ........ *A62B 18/025* (2013.01); *A41D 13/1107* (2013.01); *A41D 13/1138* (2013.01); *A41D 2400/42* (2013.01); *A41D 2400/52* (2013.01); *A41D 2500/50* (2013.01)

(58) Field of Classification Search
CPC ..... A62B 18/025; A62B 18/084; A62B 18/08; A62B 23/025; A62B 18/00; A62B 18/02; A62B 23/00; A62B 23/02; A41D 13/1107; A41D 2400/42; A41D 2400/52; A41D 2500/50; A41D 13/1115; A41D 13/11; A41D 13/1138
See application file for complete search history.

(56) References Cited

U.S. PATENT DOCUMENTS 3,971,373 A 7/1976 Braun
4,013,816 A 3/1977 Sabee et al.
4,215,682 A 8/1980 Kubik et al.
RE31,285 E 6/1983 Van Turnhout et al.
(Continued)

FOREIGN PATENT DOCUMENTS

CH 718426 9/2022
EP 0608684 B1 9/1998
(Continued)

OTHER PUBLICATIONS

Wente, “Superfine Thermoplastic Fibers”, Industrial and Engineering Chemistry, 1956, vol. 48, No. 08, pp. 1342-1346.

*Primary Examiner* — Keri J Nelson
(74) *Attorney, Agent, or Firm* — Aleksander Medved; Melissa E. Buss

(57) ABSTRACT

A disposable, flat-fold respirator having increased stiffness in selected areas, comprising: a mask body that comprises a plurality of panels which may fold in towards each other and may unfold into an open configuration, wherein the plurality of panels includes an upper panel, a lower panel, and a central panel, and wherein the respirator comprises an upper panel stiffening layer or a lower panel stiffening layer in a preselected shape and located in a preselected location in the upper panel.

9 Claims, 9 Drawing Sheets

(56) References Cited

U.S. PATENT DOCUMENTS

| | | | |
|---|---|---|---|
| 4,588,537 A | 5/1986 | Klaase et al. | |
| 4,790,306 A | 12/1988 | Braun et al. | |
| 4,798,850 A | 1/1989 | Brown | |
| 5,237,986 A | 8/1993 | Seppala et al. | |
| 5,325,892 A | 7/1994 | Japuntich et al. | |
| 5,394,568 A | 3/1995 | Brostrom et al. | |
| 5,496,507 A | 3/1996 | Angadjivand et al. | |
| 5,558,089 A | 9/1996 | Castiglione | |
| 5,656,368 A | 8/1997 | Braun et al. | |
| 5,804,295 A | 9/1998 | Braun et al. | |
| 5,908,598 A | 6/1999 | Rousseau et al. | |
| D412,573 S | 8/1999 | Castiglione | |
| D416,323 S | 11/1999 | Henderson et al. | |
| 6,041,782 A | 3/2000 | Angadjivand et al. | |
| 6,123,077 A | 9/2000 | Bostock et al. | |
| 6,332,465 B1 | 12/2001 | Xue et al. | |
| 6,375,886 B1 | 4/2002 | Angadjivand et al. | |
| 6,397,458 B1 | 6/2002 | Jones et al. | |
| 6,398,847 B1 | 6/2002 | Jones et al. | |
| 6,406,657 B1 | 6/2002 | Eitzman et al. | |
| 6,409,806 B1 | 6/2002 | Jones et al. | |
| 6,454,986 B1 | 9/2002 | Eitzman et al. | |
| 6,484,722 B2 | 11/2002 | Bostock et al. | |
| 6,536,434 B1 | 3/2003 | Bostock et al. | |
| 6,568,392 B1 | 5/2003 | Bostock et al. | |
| 6,604,524 B1 | 8/2003 | Curran et al. | |
| 6,705,317 B2 | 3/2004 | Castiglione | |
| 6,715,489 B2 | 4/2004 | Bostock et al. | |
| 6,722,366 B2 | 4/2004 | Bostock et al. | |
| 6,729,332 B1 | 5/2004 | Castiglione | |
| 6,743,464 B1 | 6/2004 | Insley et al. | |
| 6,783,574 B1 | 8/2004 | Angadjivand et al. | |
| 6,824,718 B2 | 11/2004 | Eitzman et al. | |
| 6,843,248 B2 | 1/2005 | Japuntich et al. | |
| 6,854,463 B2 | 2/2005 | Japuntich et al. | |
| 6,883,518 B2 | 4/2005 | Mittelstadt et al. | |
| 6,959,709 B2 | 11/2005 | Curran et al. | |
| 7,007,695 B2 | 3/2006 | Curran et al. | |
| 7,013,895 B2 | 3/2006 | Martin et al. | |
| 7,028,689 B2 | 4/2006 | Martin et al. | |
| 7,069,930 B2 | 7/2006 | Bostock et al. | |
| 9,770,611 B2 * | 9/2017 | Facer | A62B 23/025 |
| 2003/0154984 A1 | 8/2003 | Fernandes | |
| 2006/0180152 A1 | 8/2006 | Bostock et al. | |
| 2007/0068529 A1 | 3/2007 | Kalatoor et al. | |
| 2008/0023006 A1 | 1/2008 | Kalatoor | |
| 2008/0099022 A1 | 5/2008 | Gebrewold et al. | |
| 2008/0271739 A1 | 11/2008 | Facer et al. | |
| 2018/0368494 A1 * | 12/2018 | Henderson | A41D 13/1115 |
| 2021/0068478 A1 | 3/2021 | Lee | |
| 2021/0162243 A1 * | 6/2021 | Yang | A62B 18/025 |

FOREIGN PATENT DOCUMENTS

| | | |
|---|---|---|
| EP | 0814871 B1 | 1/2002 |
| EP | 1030721 B1 | 7/2002 |
| EP | 2799116 B1 | 8/2019 |
| JP | 2004242905 A | 9/2004 |
| WO | 199628216 A1 | 9/1996 |
| WO | 2017083289 | 5/2017 |

* cited by examiner

DISPOSABLE, FLAT-FOLD RESPIRATOR HAVING INCREASED STIFFNESS IN SELECTED AREAS

BACKGROUND

Maintenance-free respirators (sometimes referred to as "filtering face masks" or "filtering face pieces") are commonly worn over the breathing passages of a person to prevent impurities or contaminants from being inhaled by the wearer. Maintenance-free respirators typically comprise a mask body and a harness and have the filter material incorporated into the mask body itself—as opposed to having attachable filter cartridges or insert molded filter elements (see e.g., U.S. Pat. No. 4,790,306 to Braun)—to remove the contaminants from the ambient air.

To ensure that contaminants do not inadvertently enter the mask interior without passing through the filter media, maintenance-free respirators have been designed to fit snugly upon the wearer's face. Conventional maintenance-free respirators can, for the most part, match the contour of a person's face over the cheeks and chin. In the nose region, however, there is a complex contour change, which makes a snug fit more challenging to achieve. Failure to achieve a snug fit can allow air to enter or exit the respirator interior without passing through the filter media. In this situation, contaminants may enter the wearer's breathing track, and other persons or things may be exposed to contaminants exhaled by the wearer. Further, the wearer's eyewear can become fogged, which, of course, makes visibility more troublesome to the wearer and creates further unsafe conditions for the user and others.

Glossary

As used in this document, the following terms are defined as set below:

"centrally" means located such that a plane bisects the part essentially symmetrically;

"central panel" means a panel that is located between upper and lower panels;

"clean air" means a volume of atmospheric ambient air that has been filtered to remove contaminants;

"concave" means that a line tangent to the path of the perimeter segment decreases in slope and then increases in slope when moving along the perimeter path from left to right;

"contaminants" means particles (including dusts, mists, and fumes) and/or other substances that generally may not be considered to be particles (e.g., organic vapors, et cetera) but which may be suspended in air, including air in an exhale flow stream;

"exterior gas space" means the ambient atmospheric gas space into which exhaled gas enters after passing through and beyond the mask body and/or exhalation valve;

"filter" or "filtration layer" means one or more layers of material, which layer(s) is adapted for the primary purpose of removing contaminants (such as particles) from an air stream that passes through it;

"filter media" means an air-permeable structure that is designed to remove contaminants from air that passes through it;

"flat-fold" means the respirator has at least one line of demarcation about which the respirator generally folds or bends in response to simple manual pressure;

"graspable" means that the part is specifically designed for being grasped by a person's fingers;

"integral" means that it is part of the whole panel or mask body and is not a separate piece that is attached thereto;

"harness" means a structure or combination of parts that assists in supporting a mask body on a wearer's face;

"interior gas space" means the space between a mask body and a person's face;

"line of demarcation" means a fold, seam, weld line, bond line, stitch line, hinge line, and/or any combination thereof;

"lower panel" means a panel that extends under or makes contact with a wearer's chin when the respirator is being worn by a person;

"mask body" means an air-permeable structure that can fit at least over the nose and mouth of a person and that helps define an interior gas space separated from an exterior gas space;

"molded" means causing the element being molded (for example, the shaping layer) to take on a predefined form after being exposed to heat and/or pressure;

"nose clip" means a mechanical device—other than a nose foam—which device is adapted for use on a mask body to improve the seal at least around a wearer's nose;

"nose foam" means a foam-type material that is adapted for placement on the interior of a mask body to improve fit and/or wearer comfort over the nose when the respirator is being worn by a person;

"nose region" means the portion that resides over a person's nose when the respirator is worn;

"panel" means a three-dimensional part or portion that is substantially larger in first and second dimensions than in a third;

"perimeter" means the outer edge of the mask body, which outer edge would be disposed proximate to a wearer's face when the respirator is being donned by a person;

"polymer" means a material that contains repeating chemical units, regularly or irregularly arranged;

"polymeric" and "plastic" each mean a material that mainly includes one or more polymers and may contain other ingredients as well "polymer" means a material that contains repeating chemical units, regularly or irregularly arranged;

"respirator" means a device that is worn by a person to filter air before the air enters the wearer's respiratory system;

"regular periphery" is the periphery that the mask body would have if a tab was not present on the mask body;

"shaping layer" means a layer that has sufficient structural integrity to retain its desired shape (and the shape of other layers that are supported by it) under normal handling;

"tab" means a projecting part or flap, excluding an exhalation valve or harness, that is intentionally sized to be large enough for being pulled on by a person's fingers; and "upper panel" means the panel that extends over the nose region and under the wearer's eyes when the respirator is worn; and "upper segment" means the part of the perimeter that extends over the nose region and under the wearer's eyes when the respirator is being worn.

SUMMARY

One aspect of the invention provides a disposable, flat-fold respirator having increased stiffness in selected areas.

This respirator comprises: a mask body that comprises a plurality of panels which may fold in towards each other and may unfold into an open configuration, wherein the plurality of panels includes an upper panel, a lower panel, and a central panel, wherein the central panel is connected to the upper panel and lower panel, and wherein the mask body comprises an upper panel stiffening layer in a preselected shape and located in a preselected location in the upper panel; and a harness secured to the mask body.

Another aspect of the invention provides an alternative disposable, flat-fold respirator having increased stiffness in selected areas. This respirator comprises: a mask body that comprises a plurality of panels which may fold in towards each other and may unfold into an open configuration, wherein the plurality of panels includes an upper panel, a lower panel, and a central panel, wherein the central panel is connected to the upper panel and lower panel, and wherein the mask body comprises a lower panel stiffening layer in a preselected shape and located in a preselected location in the lower panel; and a harness secured to the mask body.

In yet another aspect of the invention provides another alternative disposable, flat-fold respirator having increased stiffness in selected areas. This respirator comprises: a mask body that comprises a plurality of panels which may fold in towards each other and may unfold into an open configuration, wherein the plurality of panels includes an upper panel, a lower panel, and a central panel, wherein the central panel is connected to the upper panel and lower panel, and wherein the mask body comprises an upper panel stiffening layer in a preselected shape and located in a preselected location in the upper panel, wherein the mask body comprises a lower panel stiffening layer in a preselected shape and located in a preselected location in the lower panel; and a harness secured to the mask body.

Another aspect of the invention provides an alternative disposable, flat-fold respirator having increased stiffness in selected areas. This respirator comprises: a mask body that comprises a plurality of panels which may fold in towards each other and may unfold into an open configuration, wherein the plurality of panels includes an upper panel, a lower panel, and a central panel, wherein the central panel is connected to the upper panel and lower panel, and wherein the mask body comprises an upper panel stiffening layer in the upper panel comprising materials that resist heat and humid environments; and a harness secured to the mask body.

In yet another aspect of the invention provides another alternative disposable, flat-fold respirator having increased stiffness in selected areas. This respirator comprises: a mask body that comprises a plurality of panels which may fold in towards each other and may unfold into an open configuration, wherein the mask body comprises at least one nonwoven fibrous web, wherein the plurality of panels includes an upper panel, a lower panel, and a central panel, wherein the central panel is connected to the upper panel and lower panel, wherein at least a portion of the upper panel of the mask body has an alteration to its intrinsic structure to significantly increase the pressure drop across the upper panel, the increase in pressure drop being achieved through an alteration to the intrinsic structure of the at least one nonwoven fibrous web without adding additional material or items to the mask body in a sinus region, wherein the mask body comprises an upper panel stiffening layer in the upper panel that does not interfere with the pressure drop; and a harness secured to the mask body.

DETAILED DESCRIPTION

Figure 1:
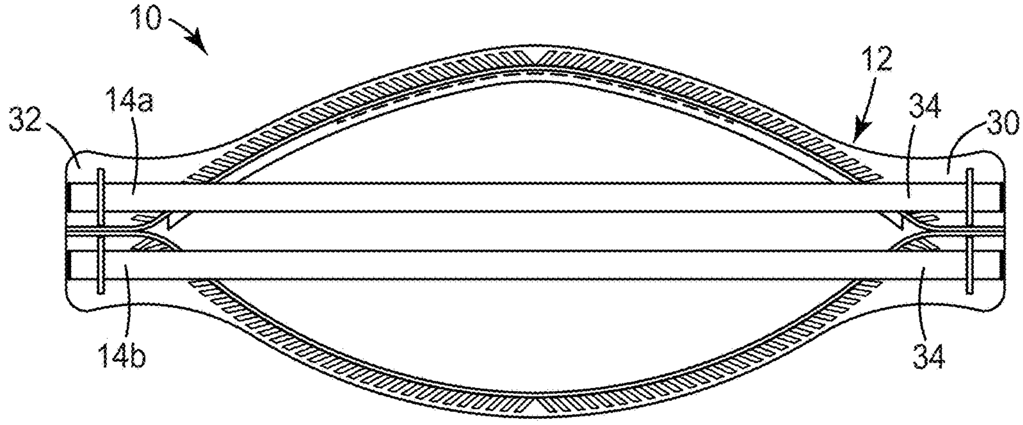
FIG. 1 is rear view of one embodiment of a respirator 10 of the present invention in a folded configuration.

In practicing the present invention, improvements in respirator construction are provided which are beneficial to using in harsh environments, such as those high in humidity, which may be typically found in work environments such as metal work, mining or ceramics. The new inventive respirator includes a mask body that is adapted to fit over a person's nose and mouth, but yet provides additional rigidity to maintain its intended shape over time.

FIGS. 1-5 illustrate an example of a flat-fold disposable respirator 10 that would be worn by persons who desire protection from inhaling airborne contaminants. Flat-fold respirators are not fully molded into their desired cup-shaped configuration for being worn by a person over the nose and mouth. Rather, the mask body is opened into the cup-shaped or open configuration from a folded condition. The illustrated flat-fold respirator 10 can provide the wearer with a source of clean air to breath. The respirator 10 includes a mask body 12 and a harness 14 where the mask body 12 has a plurality of panels, including an upper panel 16, a central panel 18, and a lower panel 20. The mask body 12 has a periphery that includes a perimeter 22, particularly a face-contacting perimeter, that would be located next to the wearer's face when the mask is being worn. A graspable tab 21 extends from the regular periphery, particularly the regular perimeter 23 (as noted by the dotted line 23 in FIG. 8A) In the illustrated embodiment, the tab 22 extends centrally from the lower panel 20. To open the mask body into the ready-to-use configuration shown in FIGS. 4 and 5, the user pulls on the tab 21 in a direction away from an adjoining or opposing panel.

Figure 3:
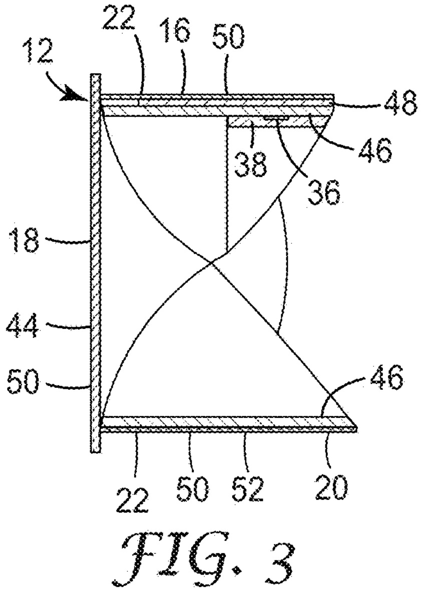
FIG. 3 is a cross-sectional view taking along line A-A in FIG. 2.

As shown in FIG. 3, the mask body may comprise a plurality of layers. These layers may include an inner cover web 46, an upper stiffening layer 48, a primary filtration layer 44, and an outer cover web 52. The layers may be joined together at the perimeter using various techniques, including adhesive bonding and ultrasonic welding. Examples of perimeter bond patterns are shown in U.S. Pat. No. D416,323 to Henderson et al. Descriptions of these various layers and how they may be constructed are set forth below. Various embodiments of the stiffening layer 48 are illustrated in FIGS. 6A-12B and discussed in more detail below.

Figure 2:
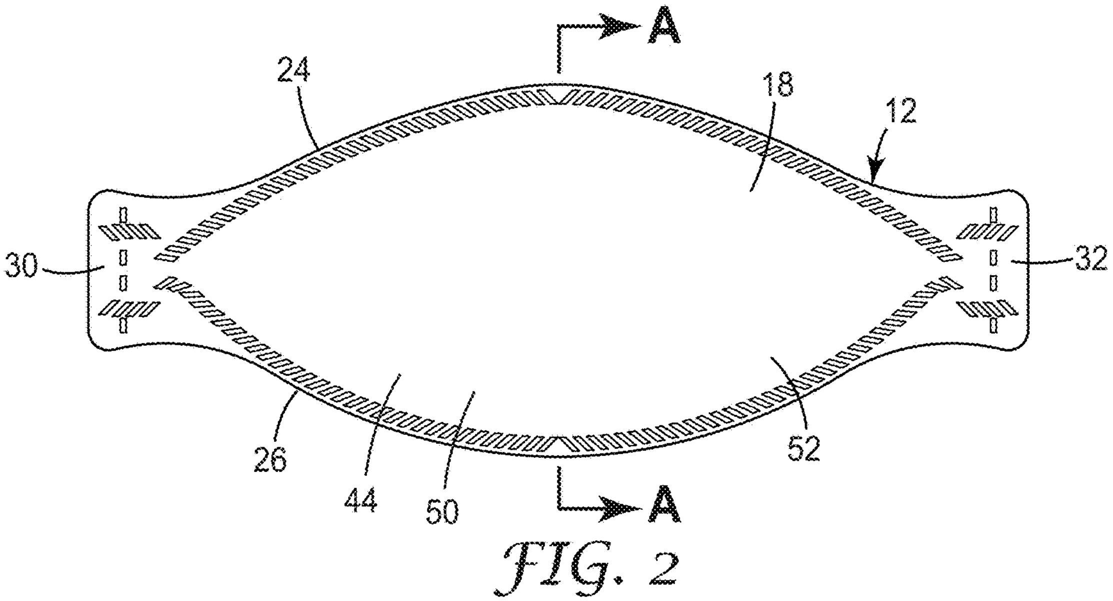
FIG. 2 is a front view of the respirator 10 of the present invention.
Figure 4:
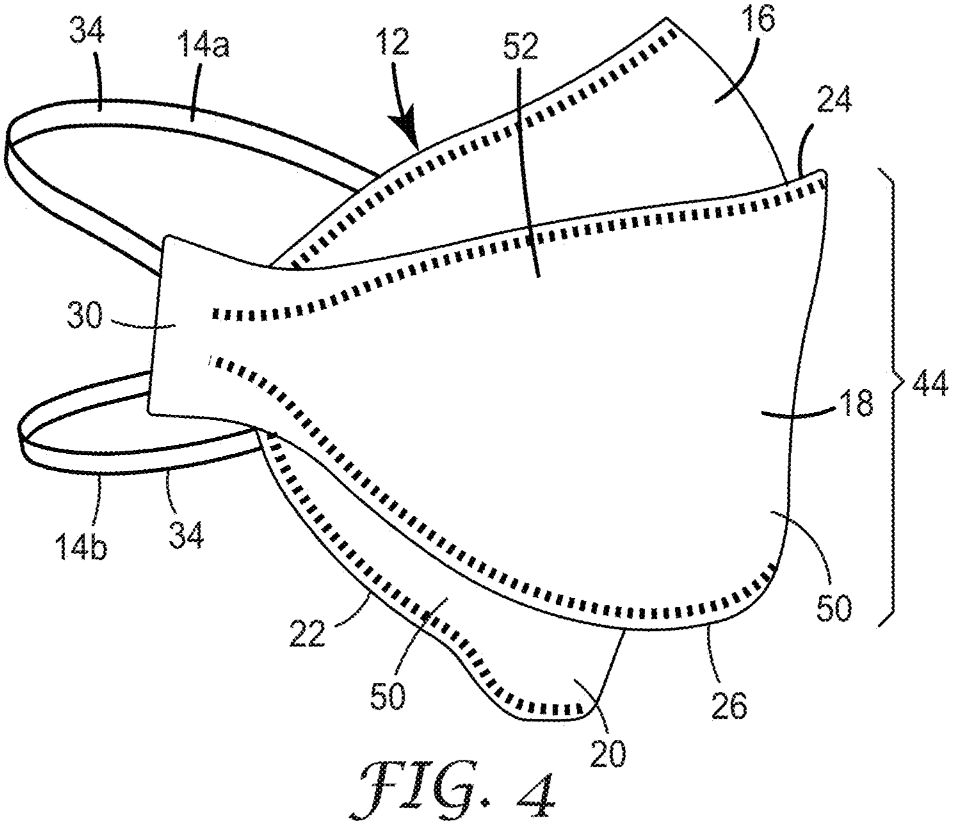
FIG. 4 is a perspective view of the respirator of FIGS. 1 and 2 shown in an open configuration.
Figure 5:
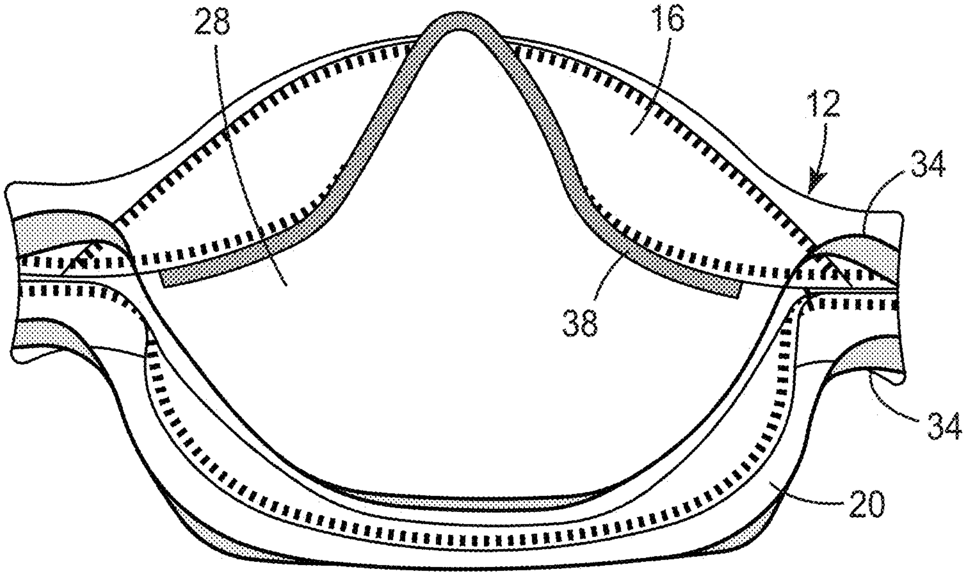
FIG. 5 is a perspective view of the respirator of FIG. 4 shown from the rear view.

FIGS. 3-5 all show the mask body in an open configuration, ready for placement on a person's face. When a person is not wearing the respirator 10, it may be folded flat for storage as shown in FIGS. 1 and 2. As shown in all of these Figures, the central panel 18 is separated from the upper panel 16 and the lower panel 20 by first and second lines of demarcation 24 and 26. The upper and lower panels 16 and 20 may each be folded inward towards the backside or inner surface 28 of the central panel 18 when the mask is being folded flat for storage (FIGS. 1-2) and may be opened outward for placement on a wearer's face (FIGS. 3-5). When the mask body 12 is taken from its open configuration to its closed configuration or vice versa, the upper and lower panels 16 and 20, respectively, rotate about the first and second lines of demarcation 24 and 26. In this sense, the first and second lines of demarcation 24 and 26 act as first and second hinges or axis, respectively, for the upper and lower panels 16 and 20. The tab 22 thus assists the user in pulling the panel 20 from its folded condition to open the mask body into an open, ready-to-use (or in-use) configuration.

As particularly shown in FIGS. 6B, 7B, 8A-10B, the tab 21 typically has a length L of about 30 to 75 millimeters (mm), more typically about 40 to 60 mm. The tab 21 also typically has a width W of about 5 to 15 mm, more typically about 8 to 12 mm. As shown, the width and length are evaluated at the widest or largest points. Although the tab is illustrated as being in a trapezoidal-type configuration, it may come in a variety of other configurations such as rectangular, semi-circular, semi-elliptical, triangular, etc. Multiple tabs also may extend from the regular periphery or regular perimeter of the mask body. Preferably the tab is centrally located so that the mask body opens in a more symmetrical manner and can be readily located by the user. Preferably, the tab extends from the regular perimeter of the mask body and would be located beneath the wearer's chin when the respirator is being donned. The tab 21 may be an integral part of the mask body, or it can be attached as a separate feature.

The respirator 10 also may be provided with first and second side tabs or flanges 30 and 32 that provide a region for securement of the harness 14 that may include straps or elastic bands 34. The straps or bands 34 are stapled 35 to the mask body 12 at each opposing side to hold the mask body 12 against the face of the wearer when the mask is being worn. U.S. Pat. No. D449,377 to Henderson et al. shows an example of tabs or flanges that can be used as strap securement regions. The harness also could be secured to the mask body by adhering, gluing, welding, etc. An example of a compression element that could be used to fasten a harness to a mask body using ultrasonic welding is described in U.S. Pat. Nos. 6,729,332 and 6,705,317 to Castiglione. The band also could be welded directly to the mask body without using a separate attachment element—see U.S. Pat. No. 6,332,465 to Xue et al. Examples of harnesses that could possibly be used in conjunction with the present invention are described in U.S. Pat. No. 5,394,568 to Brostrom et al. and U.S. Pat. No. 5,237,986 to Seppala et al. and in EP 608684A to Brostrom et al. The upper panel 16 can have its structure altered to increase resistance to air flow to help prevent the fogging of protective eyewear, for example as taught in U.S. Pat. No. 9,770,611 titled "Maintenance-Free Anti-Fog Respirator," which is hereby incorporated by reference.

The upper panel 16 of mask body 12 also may include a nose clip 36 that is made from a malleable strip of metal such as aluminum, which can be conformed by mere finger pressure to adapt the respirator to the configuration of the wearer's face in the nose region. An example of a suitable nose clip is shown and described in U.S. Pat. No. 5,558,089 and Des. 412,573 to Castiglione. Other examples are shown in U.S. Pat. No. 8,171,933 and US Patent Publication 2007/0068529.

FIG. 5 particularly shows that the respirator 10 also may include a nose foam 38 that is disposed inwardly along the inside perimeter of the upper panel 16. The foam also could extend around the whole perimeter of the mask body and could include a thermochromic fit-indicating material that contacts the wearer's face when the mask is worn. Heat from the facial contact causes the thermochromic material to change color to allow the wearer to determine if a proper fit has been established—see U.S. Pat. No. 5,617,749 to Springett et al. Examples of suitable nose foams are shown in US Patent Application Publication Nos. US2008/0099022 and US2008/0023006. The perimeter of the mask body can be sculpted along the upper panel 16 to improve compatibility of fit with protective eyewear, for example as taught in U.S. Pat. No. 10,827,787 titled "Maintenance-Free Respirator That Has Concave Portions on Opposing Sides Of Mask Top Section," which is hereby incorporated by reference.

An inner cover web 46 may be used to provide a smooth surface that contacts the face of the wearer, and an outer cover web 52 may be used to entrap loose fibers from the filtration and stiffening layers or for aesthetic reasons. A cover web typically does not provide any significant shape retention to the mask body. To obtain a suitable degree of comfort, an inner cover web preferably has a comparatively low basis weight and is formed from comparatively fine fibers. More particularly, the cover webs 46, 52 have a basis weight of about 5 to 50 g/m$^2$ (typically 10 to 30 g/m$^2$), and the fibers are less than 3.5 denier (typically less than 2 denier, and more typically less than 1 denier). Fibers used in the cover webs 26, 52 often have an average fiber diameter of about 5 to 24 micrometers (μm), typically of about 7 to 18 μm, and more typically of about 8 to 12 μm.

The cover web material 46, 52 may be suitable for use in the molding procedure by which the mask body 12 is formed, and to that end, advantageously, has a degree of elasticity (typically, but not essentially, 100 to 200% at break) or is plastically deformable.

Suitable materials for the cover web are blown microfiber (BMF) materials, particularly polyolefin BMF materials, for example polypropylene BMF materials (including polypropylene blends and also blends of polypropylene and polyethylene). A suitable process for producing BMF materials for a cover web is described in U.S. Pat. No. 4,013,816 to Sabee et al. The web may be formed by collecting the fibers on a smooth surface, typically a smooth-surfaced drum.

A typical cover web 46, 52 be made from polypropylene or a polypropylene/polyolefin blend that contains 50 weight percent or more polypropylene. These materials have been found to offer high degrees of softness and comfort to the wearer and also, when the filter material is a polypropylene BMF material, to remain secured to the filter material after the molding operation without requiring an adhesive between the layers. Typical materials for the cover web are polyolefin BMF materials that have a basis weight of about 15 to 35 grams per square meter (g/m$^2$) and a fiber denier of about 0.1 to 3.5, and are made by a process similar to that described in the '816 patent. Polyolefin materials that are suitable for use in a cover web may include, for example, a single polypropylene, blends of two polypropylenes, and blends of polypropylene and polyethylene, blends of polypropylene and poly(4-methyl-1-pentene), and/or blends of polypropylene and polybutylene. One example of a fiber for the cover web is a polypropylene BMF made from the polypropylene resin "Escorene 3505G" from Exxon Corporation and having a basis weight of about 25 g/m$^2$ and a fiber denier in the range 0.2 to 3.1 (with an average, measured over 100 fibers of about 0.8). Another suitable fiber is a polypropylene/polyethylene BMF (produced from a mixture comprising 85 percent of the resin "Escorene 3505G" and 15 percent of the ethylene/alpha-olefin copolymer "Exact 4023" also from Exxon Corporation) having a basis weight 25 g/m$^2$ and an average fiber denier of about 0.8. Other suitable materials may include spun bond materials available, under the trade designations "Coro soft Plus 20", "Coro soft Classic 20" and "Corovin PP-S-14", from Corovin GmbH of Peine, Germany, and a carded polypropylene/viscose material available, under the trade designation "370/15", from J. W. Suominen OY of Nakila, Finland.

Cover webs 46, 52 that are used in the invention preferably have very few fibers protruding from the surface of the web after processing and therefore have a smooth outer surface. Examples of cover webs 46, 52 that may be suitable to be used in the present invention are disclosed, for example, in U.S. Pat. No. 6,041,782 to Angadjivand, U.S. Pat. No. 6,123,077 to Bostock et al., and WO 96/28216A to Bostock et al.

Filter layers 50 for use in the mask body 12 of the invention can be of a particle capture or gas and vapor type. The filter layer 50 also may be a barrier layer that prevents the transfer of liquid from one side of the filter layer to another to prevent, for instance, liquid aerosols or liquid splashes from penetrating the filter layer. Multiple layers of similar or dissimilar filter types may be used to construct the filtration layer 50 of the invention as the application requires. Filters beneficially employed in a layered mask body of the invention are generally low in pressure drop (for example, less than about 20 to 30 mm $H_2O$ at a face velocity of 13.8 centimeters per second) to minimize the breathing work of the mask wearer. Filtration layers 50 are flexible and have sufficient shear strength so that they generally maintain their structure under expected use conditions. Examples of particle capture filters include one or more webs of fine inorganic fibers (such as fiberglass) or polymeric synthetic fibers. Synthetic fiber webs may include electret charged polymeric microfibers that are produced from processes such as melt blowing. Polyolefin microfibers formed from polypropylene that are surface fluorinated and electret charged provide particular utility for particulate capture applications. The filter layer 50 also may comprise a sorbent component for removing hazardous or odorous gases from the breathing air. Sorbents may include powders or granules that are bound in a filter layer by adhesives, binders, or fibrous structures—see U.S. Pat. No. 3,971,373 to Braun. A sorbent layer can be formed by coating a substrate, such as fibrous or reticulated foam, to form a thin coherent layer. Sorbent materials such as activated carbons, that are chemically treated or not, porous alumna-silica catalyst substrates, and alumna particles, are examples of sorbents that may be useful.

The filtration layer 50 may be chosen to achieve a desired filtering effect and, generally, removes a high percentage of particles or other contaminants from the gaseous stream that passes through it. For fibrous filter layers, the fibers selected depend upon the kind of substance to be filtered and, typically, are chosen so that they do not become bonded together during the molding operation. As indicated, the filter layer may come in a variety of shapes and forms. It typically has a thickness of about 0.2 millimeters (mm) to 1 centimeter (cm), more typically about 0.3 millimeters to 0.5 cm, and it could be a planar web coextensive with the shaping or stiffening layer, or it could be a corrugated web that has an expanded surface area relative to the shaping layer—see, for example, U.S. Pat. Nos. 5,804,295 and 5,656,368 to Braun et al. The filtration layer also may include multiple layers of filter media joined together by an adhesive component. Essentially any suitable material that is known for forming a filtering layer of a direct-molded respiratory mask may be used for the mask filtering material. Webs of melt-blown fibers, such as taught in Wente, Van A., *Superfine Thermoplastic Fibers,* 48 Indus. Engn. Chem., 1342 et seq. (1956), especially when in a persistent electrically charged (electret) form are especially useful (see, for example, U.S. Pat. No. 4,215,682 to Kubik et al.). These melt-blown fibers may be microfibers that have an effective fiber diameter less than about 20 micrometers (μm) (referred to as BMF for "blown microfiber"), typically about 1 to 12 μm. Effective fiber diameter may be determined according to Davies, C. N., *The Separation Of Airborne Dust Particles*, Institution Of Mechanical Engineers, London, Proceedings 1B, 1952. Particularly preferred are BMF webs that contain fibers formed from polypropylene, poly(4-methyl-1-pentene), and combinations thereof. Electrically charged fibrillated-film fibers as taught in van Turnhout, U.S. Patent Re. 31,285, may also be suitable, as well as rosin-wool fibrous webs and webs of glass fibers or solution-blown, or electrostatically sprayed fibers, especially in microfilm form. Electric charge can be imparted to the fibers by contacting the fibers with water as disclosed in U.S. Pat. No. 6,824,718 to Eitzman et al., U.S. Pat. No. 6,783,574 to Angadjivand et al., U.S. Pat. No. 6,743,464 to Insley et al., U.S. Pat. Nos. 6,454,986 and 6,406,657 to Eitzman et al., and U.S. Pat. Nos. 6,375,886 and 5,496,507 to Angadjivand et al. Electric charge also may be impacted to the fibers by corona charging as disclosed in U.S. Pat. No. 4,588,537 to Klasse et al. or by turbocharging as disclosed in U.S. Pat. No. 4,798,850 to Brown. Also, additives can be included in the fibers to enhance the filtration performance of webs produced through the hydro-charging process (see U.S. Pat. No. 5,908,598 to Rousseau et al.). Fluorine atoms, in particular, can be disposed at the surface of the fibers in the filter layer to improve filtration performance in an oily mist environment—see U.S. Pat. Nos. 6,398,847 B1, 6,397,458 B1, and 6,409,806 B1 to Jones et al. Typical basis weights for electret BMF filtration layers are about 15 to 100 grams per square meter. When electrically charged according to techniques described in, for example, the '507 patent the basis weight may be about 20 to 40 g/m$^2$ and about 10 to 30 g/m$^2$, respectively.

One of the primaries focuses of the present invention is to provide a respirator 10 with unique stiffening layers 60, which provide increase stiffness to either the upper panel 16 or the lower panel 20, or both. Various embodiments of different designs of the stiffening layers are included in FIGS. 6A-12B. The unique stiffening layers assist in providing the user a respirator that are more robust in particular environments, such as high humidity or other harsh environments such as metal work, mining, and ceramics, but still provide the same comfort as other prior 3M respirators.

Figure 6A:
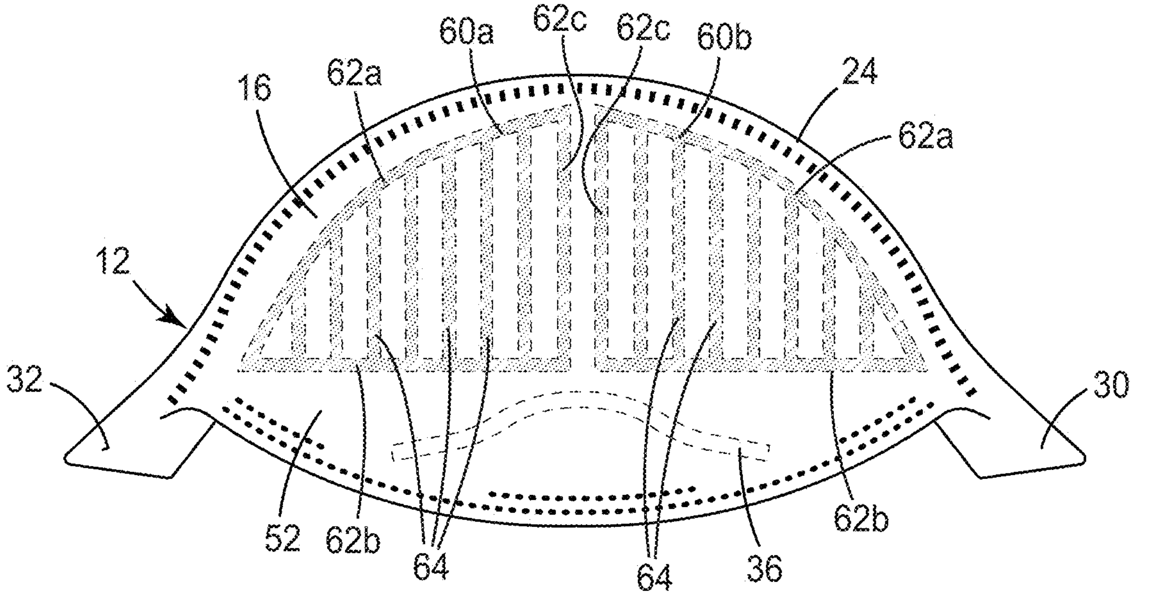
FIG. 6A is a top view of one embodiment of the upper panel of the respirator.
Figure 6B:
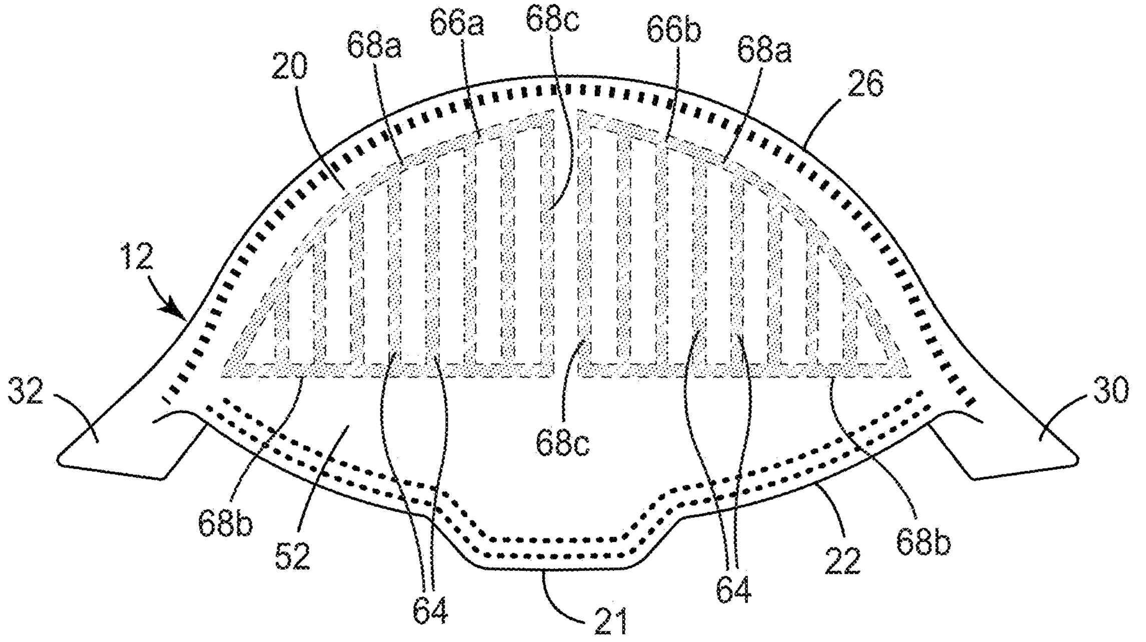
FIG. 6B is a bottom view of one embodiment of the lower panel of the respirator that is similar to FIG. 6A.

The mask body 12 may include a stiffening layer 60 in one or more of the mask panels 16, 18, 20. The purpose the stiffening layer 60 is, as its name implies, to increase the stiffness of the panel(s) relative to other panels or parts of the mask body. The stiffening panel(s) help support the mask body extending off of the face of the user and to not collapse onto their face. The stiffening layer may be located in any combination of the panels but is preferably located in either the upper panel 16 or the lower panel 20, or both panels 16, 20 of the mask body 12. In FIG. 6A, the stiffening layer 60 is illustrated as the combination of upper panel stiffening layers 60*a* and 60*b*. In FIG. 6*b*, the stiffening layer 66 is illustrated as the combination of lower panel stiffening layers 66*a* and 66*b*. Giving support to the upper and lower panels 16, 20 of the respirator 10 helps prevent the mask body 12 from collapse onto the nose, cheeks, or mouth of the user when in use, and will typically not aid in sealing the top and bottom panels in a complaint manner to the wearer's face. Instead, the nose clip and nose foam, in conjunction with the harness 14 help seal the perimeter 22 of the mask body 12 to the user's face. The stiffening layer 48 may be positioned at any point within the thickness of the layered construction of the panel and typically is located on or near the outer cover web.

The stiffening layer(s) can be formed from any number of web-based materials. These materials may include open mesh-like structures made of any number of commonly available polyolefins, such as polypropylene, polyethylene, nylon, polylactic acid and the like. The stiffening layer also may be derived from a spun bond web-based material, again made from either polypropylene or polyethylene. The distinguishing property of the stiffening layer is that its stiffness, relative to the other layers within the mask body, is greater.

The stiffening layers are preferably made from material that resist heat and humidity, so that they remain stiff in high humidity or other harsh environments such as metal work, mining, and ceramics. Examples of such suitable materials include a variety of polymeric fiber-forming materials. The polymer may be essentially any semicrystalline thermoplastic fiber-forming material that can be subjected to the chosen fiber and web formation process and that is capable of providing a charged nonwoven web that will maintain satisfactory electret properties or charge separation. Preferred polymeric fiber-forming materials are non-conductive semicrystalline resins having a volume resistivity of 1014 ohm-centimeters or greater at room temperature (22° C.). Preferably, the volume resistivity is about 10^ ohm-centimeters or greater. Resistivity of the polymeric fiber-forming material may be measured according to standardized test ASTM D 257-93. The polymeric fiber-forming material also preferably is substantially free from components such as antistatic agents that could significantly increase electrical conductivity or otherwise interfere with the fiber's ability to accept and hold electrostatic charges. Some examples of polymers which may be used in chargeable webs include thermoplastic polymers containing polyolefins such as polyethylene, polypropylene, polybutylene, poly(4-methyl-1-pentene) and cyclic olefin copolymers, and combinations of such polymers. Other polymers which may be used but which may be difficult to charge or which may lose charge rapidly include polycarbonates, block copolymers such as styrene-butadiene-styrene and styrene-isoprene-styrene block copolymers, polyesters such as polyethylene terephthalate, polyamides, polyurethanes, and other polymers that will be familiar to those skilled in the art. The stiffening layers preferably are prepared from poly-4-methyl-1 pentane or polypropylene. Most preferably, the stiffening layers are prepared from polypropylene homopolymer because of its ability to retain electric charge, particularly in moist environments.

The stiffness of a stiffening layer may be measured with Gurley Stiffness and Tabor Stiffness. Gurley Stiffness may be determined using a Model 4171 E GURLEY™ Bending Resistance Tester from Gurley Precision Instruments. Gurley Stiffness may be determined using a Model 4171 E GURLEY™ Bending Resistance Tester from Gurley Precision Instruments. The stiffening layer should include a Gurley stiffness greater than 100 mg. Taber Stiffness may be determined using a Model 150-B TABER™ stiffness tester (commercially available from Taber Industries). Also, ASTM D6125-97, Standard test method for bending resistance of paper and paperboard (Gurley Type Tester) may also be used to test and determine appropriate materials for the stiffening layer(s).

The present invention provides stiffening layers in a preselected shape and located in the preselected location in either the upper panel, the lower panel or both. Various shapes and locations are included within the scope of the invention, and although multiple embodiments are included in the Figures, the invention is not limited thereby.

FIGS. 6A and 6B illustrate two embodiments that are useful with respirators 10 that include anti-fog properties in their upper and lower panels 16, 18. Examples of such anti-fog layers are taught in U.S. Pat. No. 9,770,611 titled, "Maintenance-Free Respirator," which is hereby incorporated by reference. FIG. 6A illustrates one embodiment of an upper panel stiffening layer 60 embedded between the various layers of the upper panel 16. The upper panel stiffening layer is divided up into two portions, a first portion 60*a* and a second portion 60*b*. Each portion 60*a*, 60*b* are shaped to fit within the first line of demarcation 24 and the nose clip 36. Each portion 60*a*, 60*b* of the upper panel stiffening layer 60 include a perimeter portion 62 and a series of rib portion 64 extending between the perimeter portions 62. The perimeter portion 62 is sized in a general triangular shape but with one section rounded to fit adjacent the rounded line of demarcation 24. This design of the upper panel stiffening layer 60 is especially useful in that the anti-fog characteristics of the filtration layers are not blocked in the spaces between the adjacent rib portions 64*a*, 64*b* and outside the perimeter portions 62*a*, 62*b*.

Similarly, FIG. 6B illustrates another embodiment of the stiffening layer 66 that is relatively the same as the stiffening layer 60 illustrated in FIG. 6A, except that it is within the lower panel 20 of the respirator. As such the first portion 66*a* and second portion 66*b* of the lower panel stiffening layer 60 are positioned between the tab 21 and the second line of demarcation 26. Although the lower panel would not normally have the anti-fog properties, the design is still usefully in that it give the lower panel strength and rigidity with less weight because of the rib type structure.

Figure 7A:
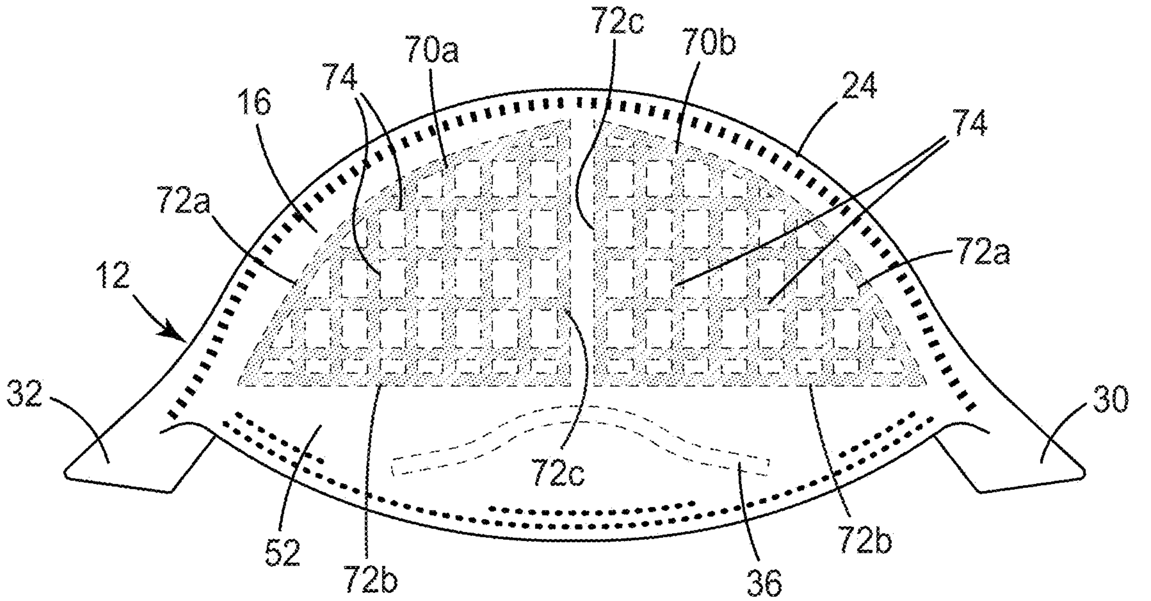
FIG. 7A is a top view of one embodiment of the upper panel of the respirator.
Figure 7B:
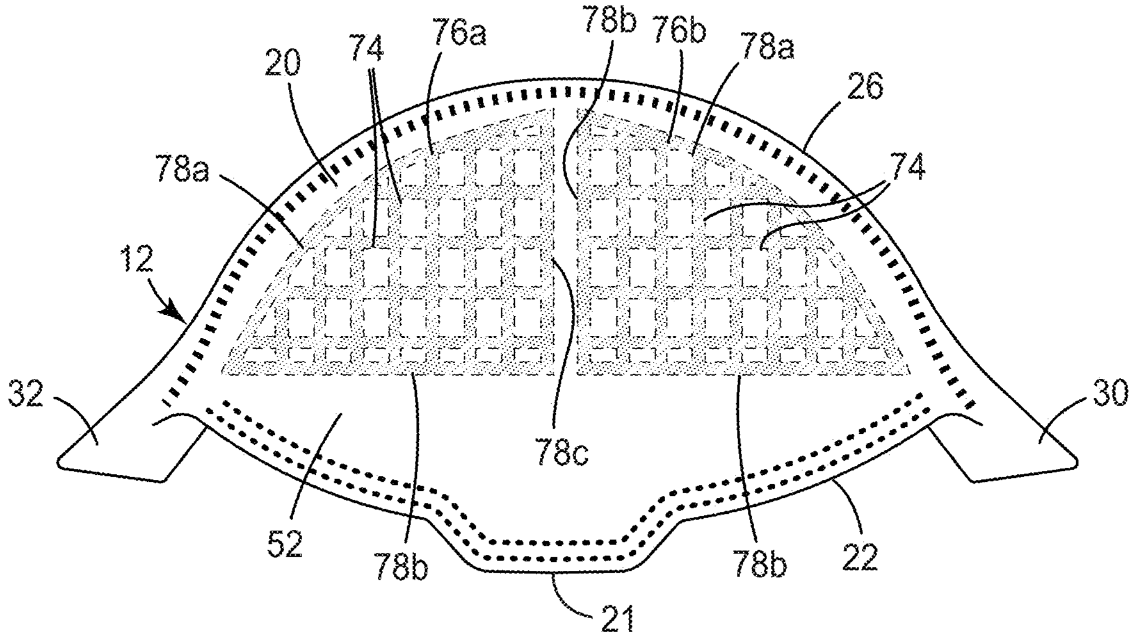
FIG. 7B is a bottom view of one embodiment of the lower panel of the respirator that is similar to FIG. 7A.

FIGS. 7A and 7B illustrate two embodiments that are useful with respirators 10 that include anti-fog properties in their upper and lower panels 16, 18. that include anti-fog properties in their upper and lower panels 16, 18. FIG. 7A illustrates one embodiment of an upper panel stiffening layer 70 embedded between the various layers of the upper panel 16. The upper panel stiffening layer 70 is divided up into two portions, a first portion 70*a* and a second portion 70*b*. Each portion 70*a*, 70*b* are shaped to fit within the first line of demarcation 24 and the nose clip 36. Each portion 70*a*, 70*b* of the upper panel stiffening layer 70 include a perimeter portion 72 and a series of both vertical and horizontal portion 74 extending between the perimeter portions 62 forming a lattice. The perimeter portion 72 is sized in a general triangular shape but with one section rounded to fit adjacent the rounded line of demarcation 24. This design of the upper panel stiffening layer 70 is especially useful in that the anti-fog characteristics of the filtration layers are not blocked in the spaces between the adjacent rib portions 74*a*, 74*b* and outside the perimeter portions 72*a*, 72*b*.

Similarly, FIG. 7B illustrates another embodiment of a lower panel stiffening layer 76 that is relatively the same as the upper panel stiffening layer 70 illustrated in FIG. 7A, except that it is within the lower panel 20 of the respirator. As such the first portion 76*a* and second portion 76*b* are positioned between the tab 21 and the second line of demarcation 26. Although the lower panel would not normally have the anti-fog properties, the design is still usefully in that it give the lower panel strength and rigidity with less weight because of the rib type structure.

Although the upper panel stiffening layers 60, 70 shown in FIGS. 6A and 7A are useful with anti-fog filtration layers, they may also be used in conjunction with respirators that do not include such layers. Also, although certain designs are illustrated with the recommended ribs and lattice structures, other design have areas that are open with alternative designs may be included by those skilled within the art.

Figure 8A:
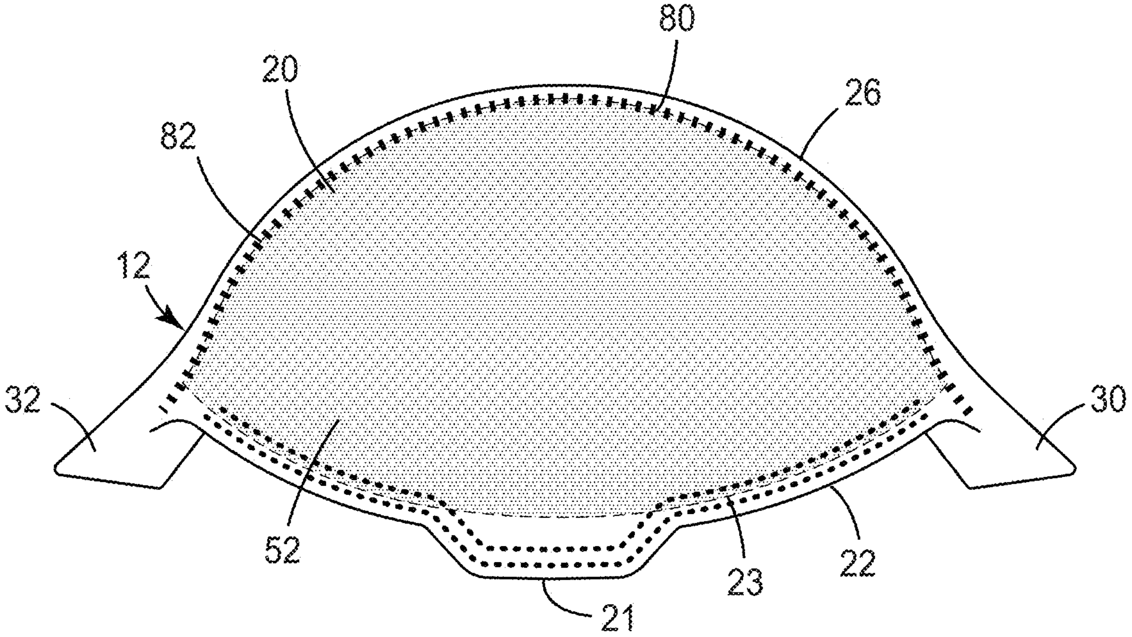
FIG. 8A is a bottom view of another embodiment of the lower panel of the respirator.
Figure 8B:
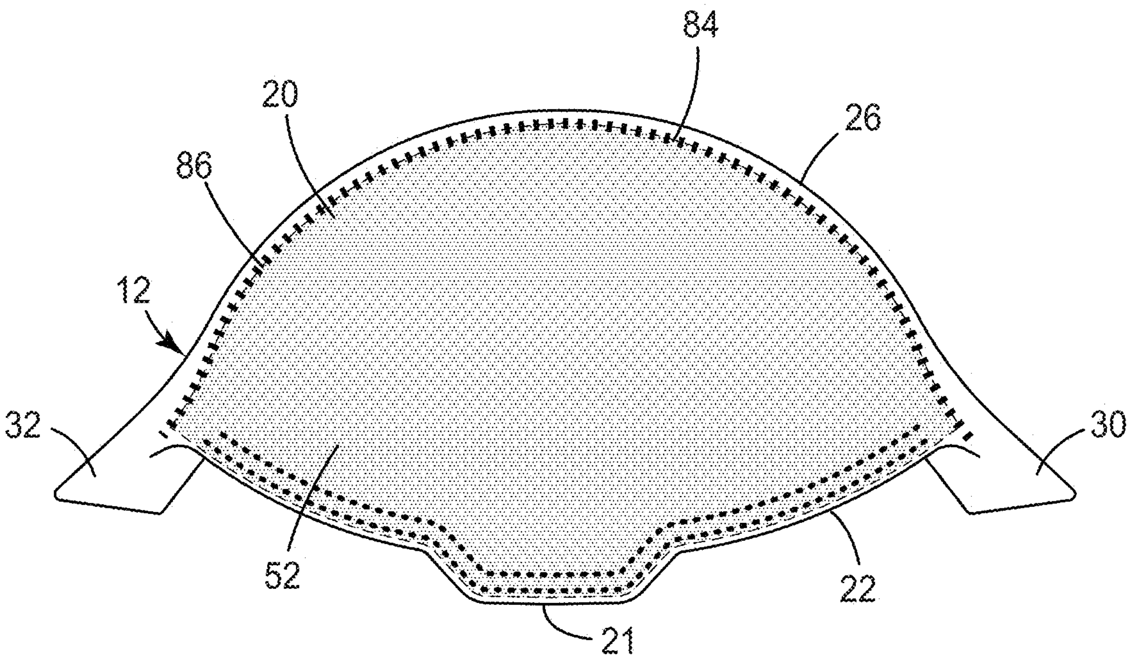
FIG. 8B is a bottom view of yet another embodiment of the lower panel of the respirator.

FIGS. 8A and 8B illustrate yet another alternative lower panel stiffening layer 80 in the lower panel 20 and lower panel stiffening layer 84 in the lower panel 20 of a respirator 10, respectively. The lower panel stiffening layer 80 shown in FIG. 8A is sized and shaped to fit within the regular or natural perimeter 23, which excludes the tab 21 and the second line of demarcation 26. The lower panel stiffening layer 80 thus provides strength and rigidity to almost the entire lower panel 20. Similarly, the lower panel stiffening layer 84 in the lower panel 20 shown in FIG. 8B also provides strength and rigidity to the entire lower panels. As illustrated, the lower panel stiffening layer 84 extends between the second line of demarcation 26 and the perimeter 22 of the mask including the tab 21.

Figure 9A:
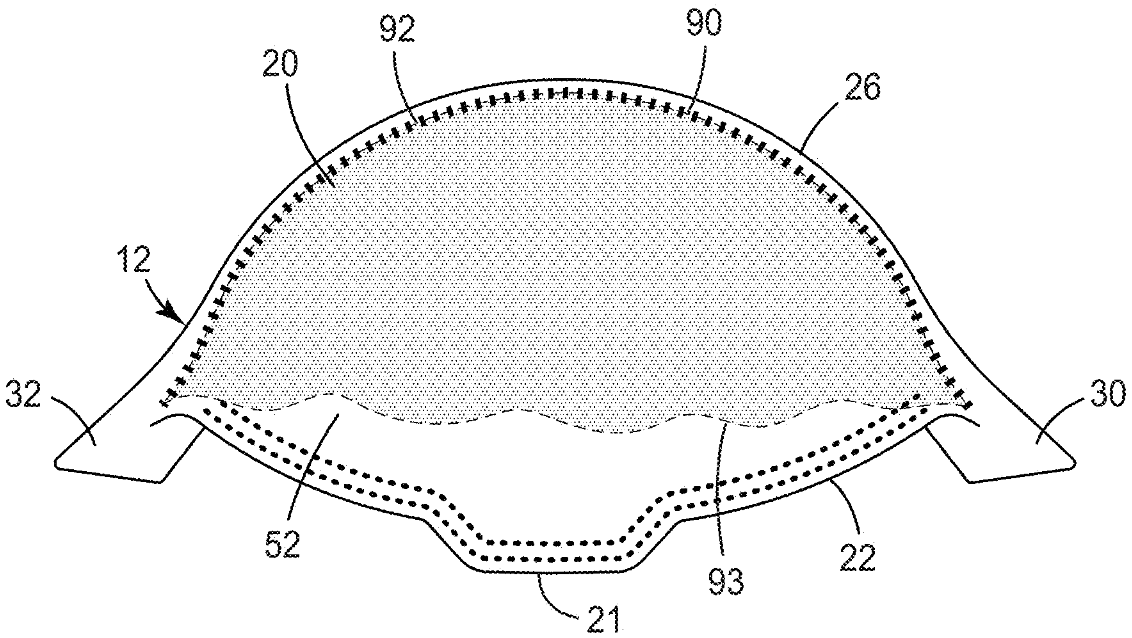
FIG. 9A is a bottom view of another embodiment of the lower panel of the respirator.
Figure 9B:
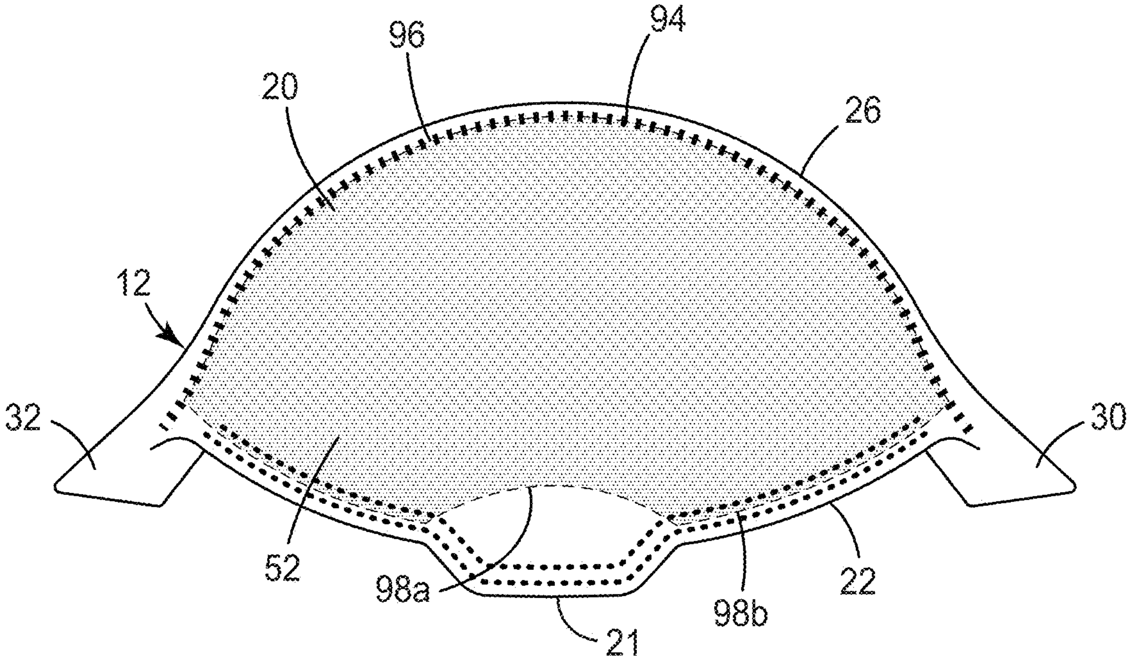
FIG. 9B is a bottom view of yet another embodiment of the lower panel of the respirator.

FIGS. 9A and 9B illustrate alternative lower panel stiffening layer 90 in the lower panel and lower panel stiffening layer 94 in the lower panel 20 of a respirator 10, respectively. The stiffening layer 90 shown in FIG. 9A is sized and shaped to fit between the second line of demarcation 26 and the tab 21. The stiffening layer 90 includes a perimeter 92 which aligns with the demarcation line 26 and opposite the demarcation line 26 it has a parameter 93 in the shape of a sine wave. The stiffening layer 80 thus provides strength and rigidity to almost two thirds of the lower panel 20.

The lower panel stiffening layer 94 shown in FIG. 9B also provides strength and rigidity to the entire lower panels. As illustrated, the lower panel stiffening layer 94 extends between the second line of demarcation 26 and the perimeter 22 of the mask including the tab 21. The perimeter 98 which aligns with the leading edge of the lower panel 20 adjacent the tab 21 includes two portions 98*a*, 98*b*. Portion 98*a* is curved in a direction away from the tab 21 and extends between portion 98*b*, which align with the leading edge, as illustrated in FIG. 9B.

Figure 10A:
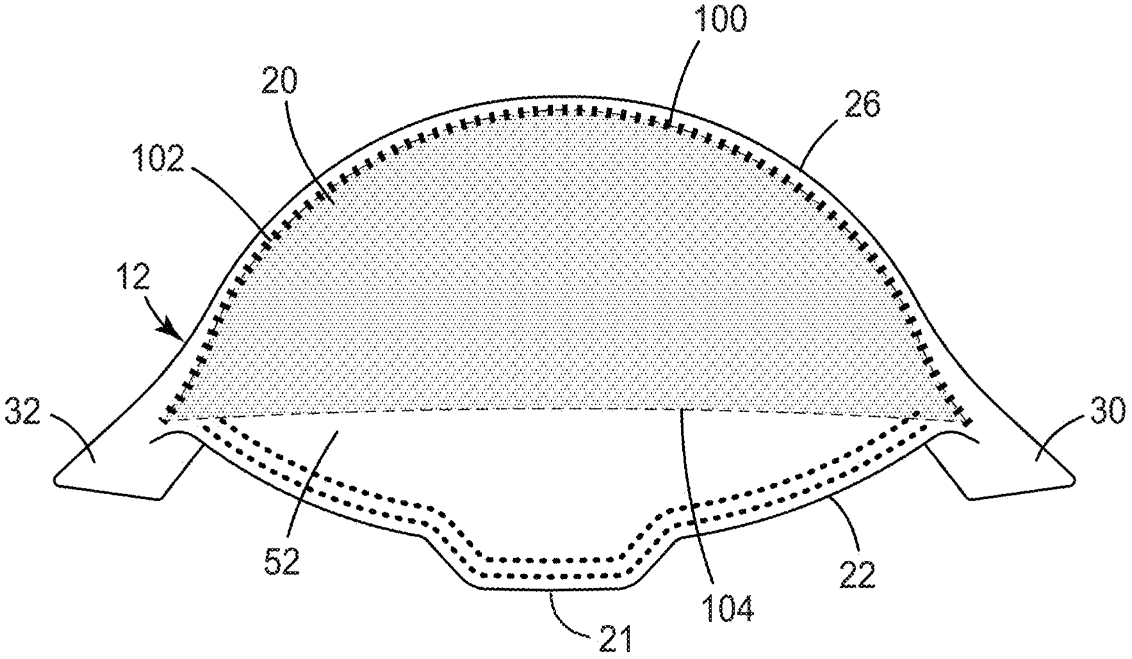
FIG. 10A is a bottom view of another embodiment of the lower panel of the respirator.
Figure 10B:
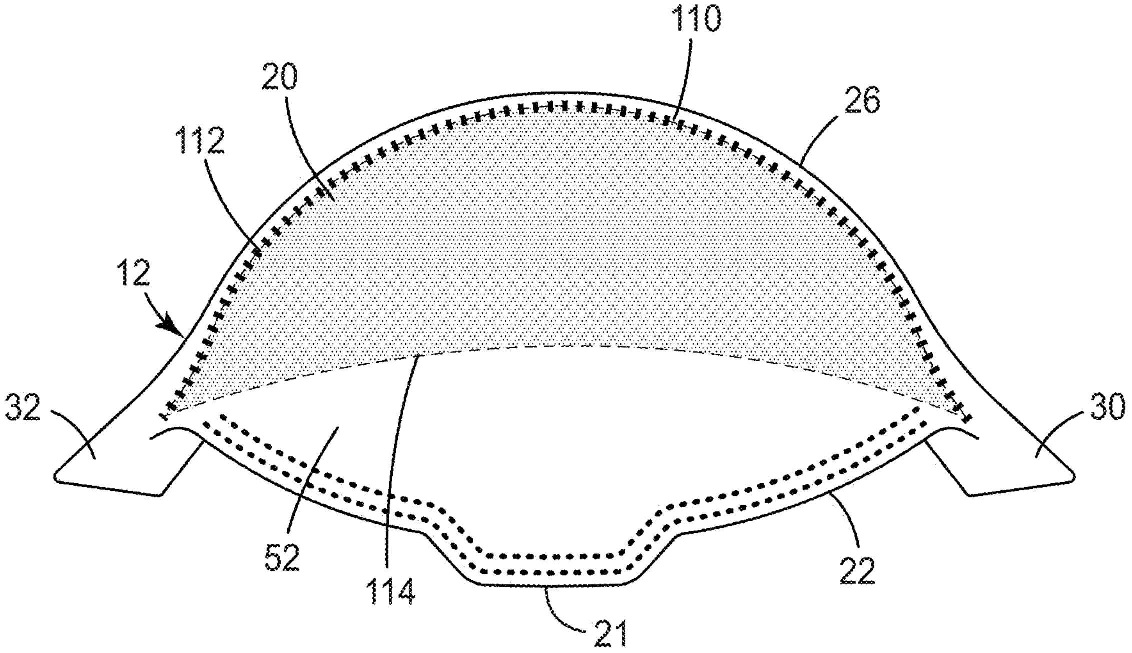
FIG. 10B is a bottom view of yet another embodiment of the lower panel of the respirator.

FIGS. 10A and 10B illustrate similarly designed lower panel stiffening layers 100 and 110, respectively within the lower panels 20 of alternative respirator 10. Lower panel stiffening layer 100 is located between the second line of demarcation 26 and the first and second tabs 30, 32. The lower panel stiffening layer 100 has a curved perimeter 102 which closely matches the line of demarcation 26, forming a half circle. The lower panel stiffening layer 100 also has a straight perimeter 104 that extends between the first and second tabs 20, 32.

FIG. 10B illustrates a respirator having a lower panel stiffening layer 110 within the lower panels 20 of another respirator 10. Lower panel stiffening layer 110 is located between the second line of demarcation 26 and the first and second tabs 30, 32. The lower panel stiffening layer 100 has a curved perimeter 112 which closely matches the line of demarcation 26, forming a half circle. The lower panel stiffening layer 100 also has a curved perimeter 114 that extends between the first and second tabs 30, 32.

Figure 11A:
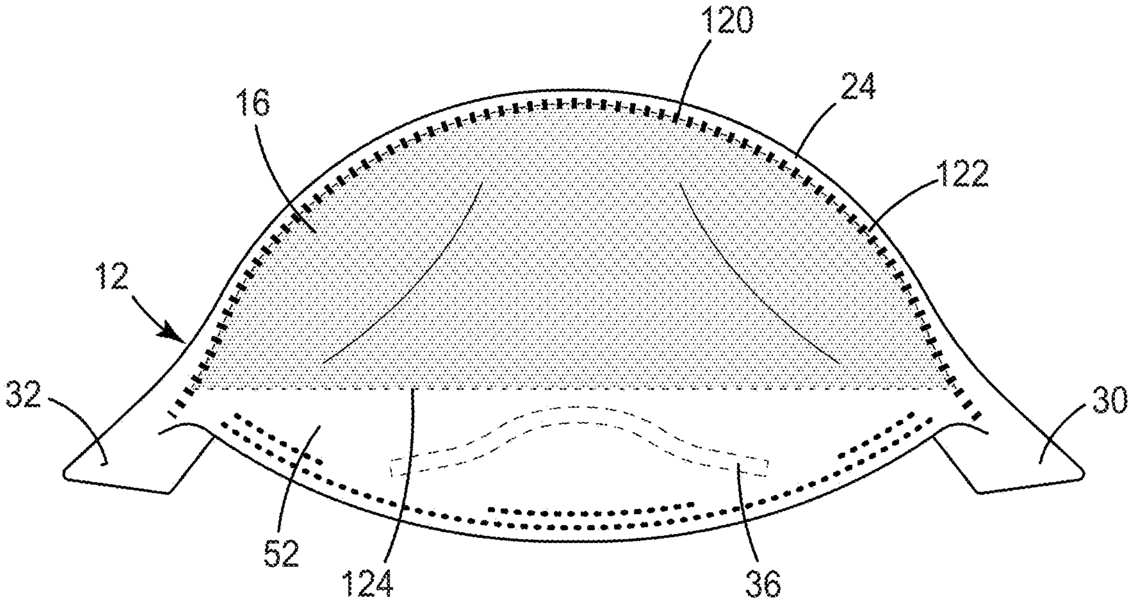
FIG. 11A is a top view of another embodiment of the upper panel of the respirator.
Figure 11B:
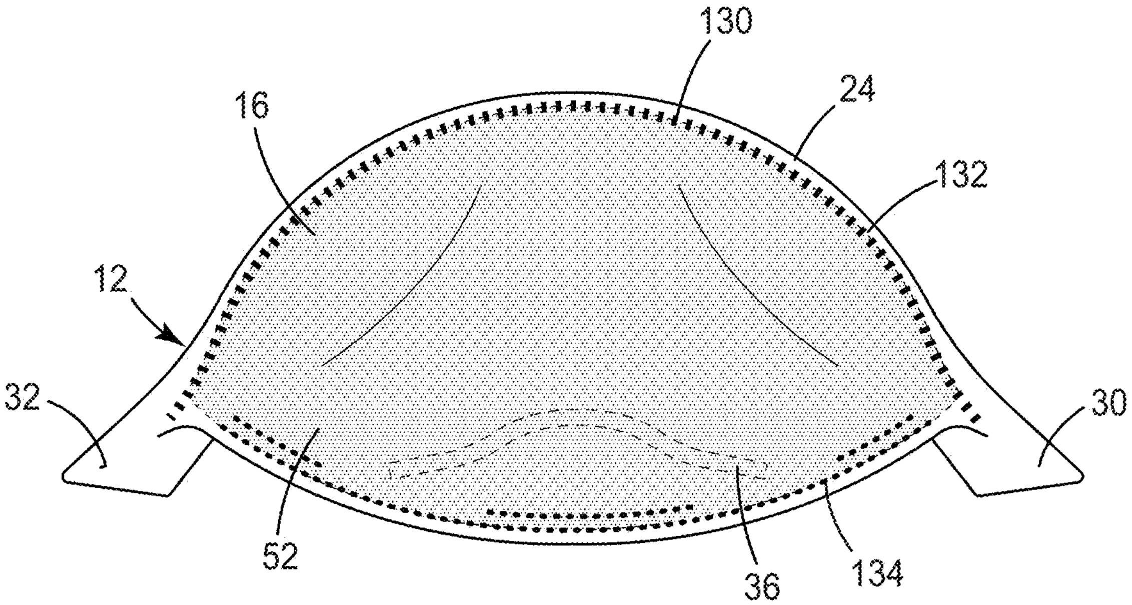
FIG. 11B is a top view of yet another embodiment of the upper panel of the respirator.

FIGS. 11A and 11B illustrate similarly designed upper panel stiffening layers 120 and 130, respectively within the upper panels 16 of alternative respirators 10. Upper panel stiffening layer 120 is located between the first line of demarcation 24 and the first and second tabs 30, 32. The stiffening layer 120 has a curved perimeter 122 which closely matches the line of demarcation 24. The upper panel stiffening layer 120 also has a straight perimeter 124 that extends between the first and second tabs 30, 32.

FIG. 11B helps illustrate an upper panel stiffening layer 130 that is embedded throughout the entire upper panel 16 of respirator 10. The perimeters 132 and 134 are sized and shaped to closely fit within the entire upper panel 16, closely aligning with the demarcation line 24 and the upper edge of the panel 16.

Figure 12A:
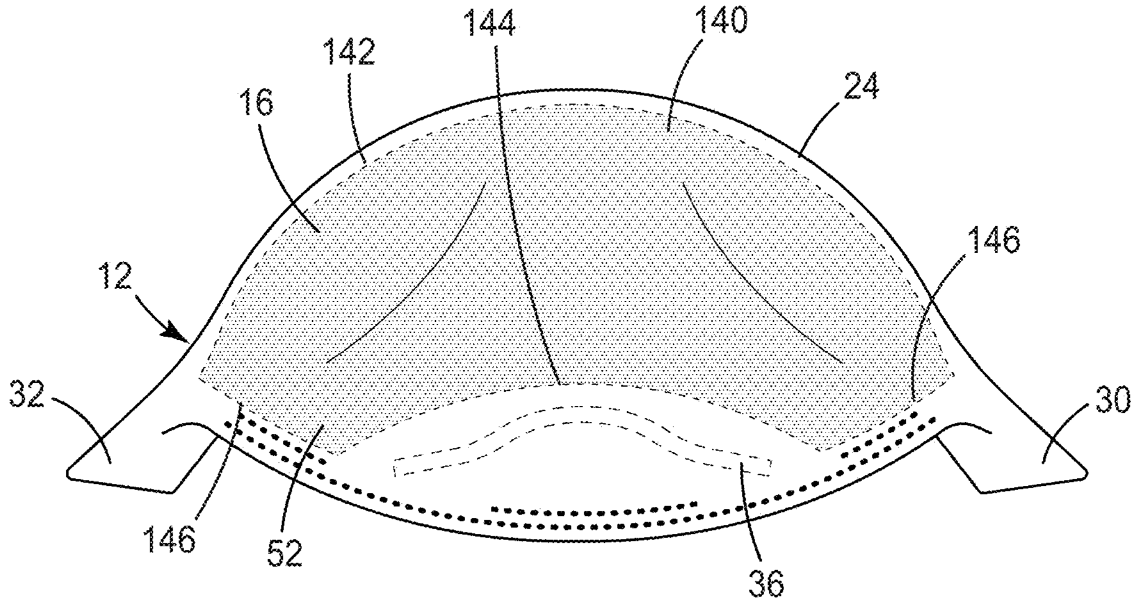
FIG. 12A is a top view of another embodiment of the upper panel of the respirator.
Figure 12B:
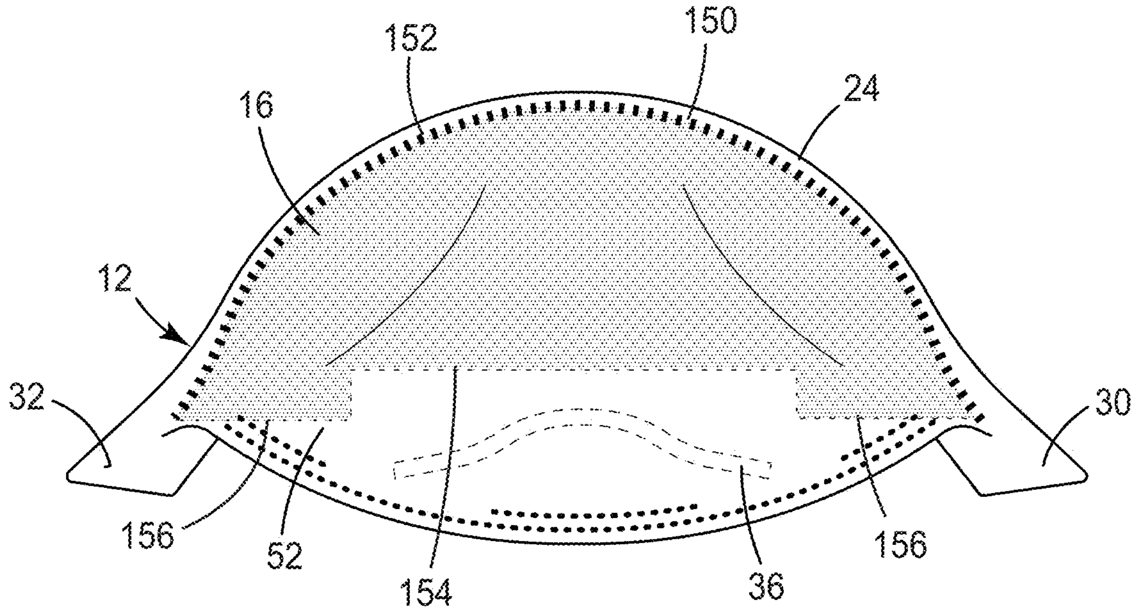
FIG. 12B is a top view of yet another embodiment of the upper panel of the respirator.

Lastly, FIGS. 12A and 12B illustrate other upper panel stiffening layers 140, 150 respectively that may be embedded in the entire upper panel 16 of respirator 10. In the embodiment shown in FIG. 12A the upper panel stiffening layer 140 is shaped to have a perimeter 142 that closely aligns with the first line of demarcation 24, and a second perimeter having three portions, first portion 146 and third portion 146 which extend from perimeter 142 away from the first and second tables 30, 32 respectively, and a second portion 144 which is shaped to avoid overlapping with the nose clip 36.

FIG. 12B illustrates an upper panel stiffening layer 150 within the upper panel of alternative respirators 10. Upper panel stiffening layer 150 is located between the second line of demarcation 24 and the first and second tabs 30, 32. The stiffening layer 150 has a curved perimeter 152 which closely matches the line of demarcation 26, forming a half circle. The upper panel stiffening layer 150 also has a straight perimeter 156 that extends between the first and second tabs 20, 32, but with a cut out 154. This design also helps the stiffening layer 150 avoid the nose clip 36.

The various designs and configurations of the specific stiffening layers illustrated in the Figures, whether shown in the upper or lower panels 16, 20 may be mixed and matched into different combinations, depending on the various levels of stiffness required for the intended use of the respirator. The stiffening layers may be configured in size and shape so as to not overlap any portion of the respirator that directly contacts or touches the face of a user. This particular design may be more comfortable for the user. For instance if just a small area adjacent the perimeter of the mask contacts the user's face, then the stiffening layer may be sized appropriately to avoid that same area. Certain thicknesses of the layers may be desired to also help comfort in wearing of the respirators by the users. For instance, if the stiffening layers are made of certain polymers, such as polypropylene or polyethylene, preferred thicknesses of the stiffening layers are in the range of 0.1 mm-3 mm, and more preferred thicknesses of the stiffening layers are in the range of 0.75 mm-2 mm. As another design consideration which may aid in comfort to the wearer, the stiffening layer may include a smaller overall footprint or cover an area that is less than the area of either the upper panel or the lower panel For instance, at minimum of only 3% surface area of the upper or lower panel may include a stiffening layer.

The respirator also may include an optional exhalation valve that allows for the easy exhalation of air by the user. Exhalation valves that exhibit an extraordinarily low pressure drop during an exhalation are described in U.S. Pat. Nos. 7,188,622, 7,028,689, and 7,013,895 to Martin et al.; U.S. Pat. Nos. 7,117,868, 6,854,463, 6,843,248, and 5,325,892 to Japuntich et al.; and U.S. Pat. No. 6,883,518 to Mittelstadt et al. The exhalation valve may be secured to the central panel, preferably near the middle of the central panel, by a variety of means including sonic welds, adhesion bonding, mechanical clamping, and the like—see, for example, U.S. Pat. Nos. 7,069,931, 7,007,695, 6,959,709, and 6,604,524 to Curran et al and EP1,030,721 to Williams et al.

Flat-fold, maintenance-free respirators of the present invention can be manufactured according to the process described in U.S. Pat. Nos. 6,123,077, 6,484,722, 6,536,434, 6,568,392, 6,715,489, 6,722,366, 6,886,563, 7,069,930, and US Patent Publication No. US2006/0180152A1 and EP0814871B1 to Bostock et al. The respirator manufacturing process would include a supply of precut material for the stiffening layers which would be incorporated between the other webs of material forming the respirator. The stiffening layers could be held in place between the layers and between certain weld lines.

SELECT EMBODIMENTS OF THE PRESENT DISCLOSURE

Embodiment 1 is a disposable, flat-fold respirator having increased stiffness in selected areas, wherein the respirator comprises: a mask body that comprises a plurality of panels which may fold in towards each other and may unfold into an open configuration, wherein the plurality of panels includes an upper panel, a lower panel, and a central panel, wherein the central panel is connected to the upper panel and lower panel, and wherein the mask body comprises an upper panel stiffening layer in a preselected shape and located in a preselected location in the upper panel; and a harness secured to the mask body.

Embodiment 2 is the respirator of embodiment 1, wherein the upper panel and lower panel are configured to fold in towards the central panel to put the respirator into a closed configuration, and wherein the upper panel and lower panel are configured to unfold away from the central panel to put the respirator into an open configuration.

Embodiment 3 is the respirator of embodiment 1, wherein the upper panel includes an outer perimeter, and the upper panel stiffening layer includes an outer perimeter, wherein the outer perimeter of the upper panel stiffening layer corresponds to the outer perimeter of the upper panel.

Embodiment 4 is the respirator of embodiment 1, wherein the upper panel stiffening layer comprises open mesh like structures or fibrous webs made of polymers.

Embodiment 5 is the respirator of embodiment 1, wherein the upper panel stiffening layer comprises polyolefins.

Embodiment 6 is the respirator of embodiment 1, wherein the upper panel stiffening layer comprising materials that resist heat and humid environments.

Embodiment 7 is the respirator of embodiment 1, further comprising a nose clip and wherein the upper panel stiffening layer is shaped to avoid the nose clip.

Embodiment 8 is the respirator of embodiment 1, further comprising a nose foam and wherein the upper panel stiffening layer is shaped to avoid the nose foam.

Embodiment 9 is the respirator of embodiment 1 further comprising a graspable tab extending from the lower panel, wherein the graspable tab assists the user in pulling the panels from a folded condition to open the mask body from the folded configuration into an open ready-to-use configuration.

Embodiment 10 is the respirator of embodiment 1, wherein the upper panel resides over the nose and beneath the wearer's eyes, when the respirator is being worn, the upper panel comprises the first and second concave segments.

Embodiment 11 is the respirator of embodiment 1, wherein a minimum of 3% of the surface area of the upper panel includes a stiffening layer.

Embodiment 12 is the respirator of embodiment 1, wherein the upper panel stiffening layer includes a thickness in the range of 0.1 mm to 3 mm.

Embodiment 13 is the respirator of embodiment 1, wherein the upper panel stiffening layer is configured in shape or size to not overlap any face-contacting portions of the mask body.

Embodiment 14 is a disposable, flat-fold respirator having increased stiffness in selected areas, comprising: a mask body that comprises a plurality of panels which may fold in towards each other and may unfold into an open configuration, wherein the plurality of panels includes an upper panel, a lower panel, and a central panel, wherein the central panel is connected to the upper panel and lower panel, and wherein the mask body comprises a lower panel stiffening layer in a preselected shape and located in a preselected location in the lower panel; and a harness secured to the mask body.

Embodiment 15 is the respirator of embodiment 14, wherein the upper panel and lower panel are configured to fold in towards the central panel to put the respirator into a closed configuration, and wherein the upper panel and lower panel are configured to unfold away from the central panel to put the respirator into an open configuration.

Embodiment 16 is the respirator of embodiment 14, wherein the lower panel includes an outer perimeter, and the lower panel stiffening layer includes an outer perimeter, wherein the outer perimeter of the lower panel stiffening layer corresponds to the outer perimeter of the lower panel.

Embodiment 17 is the respirator of embodiment 14, wherein the lower panel stiffening layer comprises open mesh like structures or fibrous webs made of polymers.

Embodiment 18 is the respirator of embodiment 14, wherein the lower panel stiffening layer comprises polyolefins.

Embodiment 19 is the respirator of embodiment 14, wherein the mask body comprises a lower panel stiffening layer comprising materials that resist heat and humid environments.

Embodiment 20 is the respirator of embodiment 14, further comprising a nose clip and wherein the lower panel stiffening layer is shaped to avoid the nose clip.

Embodiment 21 is the respirator of embodiment 14 further comprising a graspable tab extending from the lower panel, wherein the graspable tab assists the user in pulling the panels from a folded condition to open the mask body from the folded configuration into an open ready-to-use configuration.

Embodiment 22 is the respirator of embodiment 14, wherein the upper panel resides over the nose and beneath the wearer's eyes, when the respirator is being worn, the upper panel comprises the first and second concave segments.

Embodiment 23 is the respirator of embodiment 14, wherein a minimum of 3% of the surface area of the lower panel includes the lower panel stiffening layer.

Embodiment 24 is the respirator of embodiment 14, wherein the lower panel stiffening layer includes a thickness in the range of 01. mm to 3 mm.

Embodiment 25 is the respirator of embodiment 14, wherein the lower panel stiffening layer is configured in shape or size to not overlap any face-contacting portions of the mask body.

Embodiment 26 is a disposable, flat-fold respirator having increased stiffness in selected areas, comprising: a mask body that comprises a plurality of panels which may fold in towards each other and may unfold into an open configuration, wherein the plurality of panels includes an upper panel, a lower panel, and a central panel, wherein the central panel is connected to the upper panel and lower panel, and wherein the mask body comprises an upper panel stiffening layer in a preselected shape and located in a preselected location in the upper panel, wherein the mask body comprises a lower panel stiffening layer in a preselected shape and located in a preselected location in the lower panel; and a harness secured to the mask body.

Embodiment 27 is the respirator of embodiment 26, wherein the upper panel and lower panel are configured to fold in towards the central panel to put the respirator into a closed configuration, and wherein the upper panel and lower panel are configured to unfold away from the central panel to put the respirator into an open configuration.

Embodiment 28 is the respirator of embodiment 26, wherein the upper panel includes an outer perimeter, and the upper panel stiffening layer includes an outer perimeter, wherein the outer perimeter of the upper panel stiffening layer corresponds to the outer perimeter of the upper panel, wherein the lower panel includes an outer perimeter, and the lower panel stiffening layer includes an outer perimeter, wherein the outer perimeter of the lower panel stiffening layer corresponds to the outer perimeter of the lower panel.

Embodiment 29 is the respirator of embodiment 26, wherein the upper panel stiffening layer and lower panel stiffening layer comprises open mesh like structures or fibrous webs made of polymers.

Embodiment 30 is the respirator of embodiment 26, wherein the upper panel stiffening layer and lower panel stiffening layer comprises polyolefins.

Embodiment 31 is the respirator of embodiment 26, wherein the upper panel stiffening layer and the lower panel stiffening layer comprising materials that resist heat and humid environments.

Embodiment 32 is the respirator of embodiment 26, further comprising a nose clip and wherein the upper panel stiffening layer is shaped to avoid the nose clip.

Embodiment 33 is the respirator of embodiment 26, further comprising a nose foam and wherein the upper panel stiffening layer is shaped to avoid the nose foam.

Embodiment 34 is the respirator of embodiment 26 further comprising a graspable tab extending from the lower panel, wherein the graspable tab assists the user in pulling the panels from a folded condition to open the mask body from the folded configuration into an open ready-to-use configuration.

Embodiment 35 is the respirator of embodiment 26, wherein the upper panel resides over the nose and beneath the wearer's eyes, when the respirator is being worn, the upper panel comprises the first and second concave segments.

Embodiment 36 is the respirator of embodiment 26, wherein a minimum 3% of the surface area of the upper panel includes the lower panel stiffening layer.

Embodiment 37 is the respirator of embodiment 26, wherein the upper panel stiffening layer and the lower panel stiffening layer both include a thickness in the range of 0.1 mm to 3 mm.

Embodiment 38 is the respirator of embodiment 26, wherein the upper panel stiffening layer and the lower panel stiffening layer is configured in shape or size to not overlap any face-contacting portions of the mask body.

Embodiment 39 is a disposable, flat-fold respirator having increased stiffness in selected areas, comprising: a mask body that comprises a plurality of panels which may fold in towards each other and may unfold into an open configuration, wherein the plurality of panels includes an upper panel, a lower panel, and a central panel, wherein the central panel is connected to the upper panel and lower panel, and wherein the mask body comprises an upper panel stiffening layer in the upper panel comprising materials that resist heat and humid environments; and a harness secured to the mask body.

Embodiment 40 is the respirator of embodiment 39, wherein the mask body comprises a lower panel stiffening layer in the lower panel comprising materials that resist heat and humid environments Embodiment 41 is the respirator of embodiment 39, wherein the upper panel and lower panel are configured to fold in towards the central panel to put the respirator into a closed configuration, and wherein the upper panel and lower panel are configured to unfold away from the central panel to put the respirator into an open configuration.

Embodiment 42 is the respirator of embodiment 39, wherein the upper panel includes an outer perimeter, and the upper panel stiffening layer includes an outer perimeter, wherein the outer perimeter of the upper panel stiffening layer corresponds to the outer perimeter of the upper panel.

Embodiment 43 is the respirator of embodiment 39, wherein the upper panel stiffening layer comprises open mesh like structures or fibrous webs made of polymers.

Embodiment 44 is the respirator of embodiment 39, wherein the upper panel stiffening layer comprises polyolefins.

Embodiment 45 is the respirator of embodiment 39, wherein the upper panel stiffening layer comprising materials that resist heat and humid environments.

Embodiment 46 is the respirator of embodiment 39, further comprising a nose clip and wherein the upper panel stiffening layer is shaped to avoid the nose clip.

Embodiment 47 is the respirator of embodiment 39, further comprising a nose foam and wherein the upper panel stiffening layer is shaped to avoid the nose foam.

Embodiment 48 is the respirator of embodiment 39 further comprising a graspable tab extending from the lower panel, wherein the graspable tab assists the user in pulling the panels from a folded condition to open the mask body from the folded configuration into an open ready-to-use configuration.

Embodiment 49 is the respirator of embodiment 39, wherein the upper panel resides over the nose and beneath the wearer's eyes, when the respirator is being worn, the upper panel comprises the first and second concave segments.

Embodiment 50 is the respirator of embodiment 39, wherein a minimum of 3% of the surface area of the upper panel includes a stiffening layer.

Embodiment 51 is the respirator of embodiment 39, wherein the upper panel stiffening layer includes a thickness in the range of 0.1 mm to 3 mm.

Embodiment 52 is the respirator of embodiment 39, wherein the upper panel stiffening layer is configured in shape or size to not overlap any face-contacting portions of the mask body.

Embodiment 53 is a disposable, flat-fold respirator having increased stiffness in selected areas, comprising: a mask body that comprises a plurality of panels which may fold in towards each other and may unfold into an open configuration, wherein the mask body comprises at least one nonwoven fibrous web, wherein the plurality of panels includes an upper panel, a lower panel, and a central panel, wherein the central panel is connected to the upper panel and lower panel, wherein at least a portion of the upper panel of the mask body has an alteration to its intrinsic structure to significantly increase the pressure drop across the upper panel, the increase in pressure drop being achieved through an alteration to the intrinsic structure of the at least one nonwoven fibrous web without adding additional material or items to the mask body in a sinus region, wherein the mask body comprises an upper panel stiffening layer in the upper panel that does not interfere with the pressure drop; and a harness secured to the mask body.

Embodiment 54 is the respirator of embodiment 53, wherein the upper panel and lower panel are configured to fold in towards the central panel to put the respirator into a closed configuration, and wherein the upper panel and lower panel are configured to unfold away from the central panel to put the respirator into an open configuration.

Embodiment 56 is the respirator of embodiment 53, wherein the upper panel includes an outer perimeter, and the upper panel stiffening layer includes an outer perimeter, wherein the outer perimeter of the upper panel stiffening layer corresponds to the outer perimeter of the upper panel.

Embodiment 57 is the respirator of embodiment 53, wherein the upper panel stiffening layer comprises open mesh like structures or fibrous webs made of polymers.

Embodiment 58 is the respirator of embodiment 53, wherein the upper panel stiffening layer comprises polyolefins.

Embodiment 59 is the respirator of embodiment 53, wherein the upper panel stiffening layer comprising materials that resist heat and humid environments.

Embodiment 60 is the respirator of embodiment 53, further comprising a nose clip and wherein the upper panel stiffening layer is shaped to avoid the nose clip.

Embodiment 61 is the respirator of embodiment 53, further comprising a nose foam and wherein the upper panel stiffening layer is shaped to avoid the nose foam.

Embodiment 62 is the respirator of embodiment 53 further comprising a graspable tab extending from the lower panel, wherein the graspable tab assists the user in pulling the panels from a folded condition to open the mask body from the folded configuration into an open ready-to-use configuration.

Embodiment 63 is the respirator of embodiment 53, wherein the upper panel resides over the nose and beneath the wearer's eyes, when the respirator is being worn, the upper panel comprises the first and second concave segments.

Embodiment 64 is the respirator of embodiment 54, wherein a minimum of 3% of the surface area of the upper panel includes a stiffening layer.

Embodiment 65 is the respirator of embodiment 54, wherein the upper panel stiffening layer includes a thickness in the range of 0.1 mm to 3 mm.

Embodiment 66 is the respirator of embodiment 54, wherein the upper panel stiffening layer is configured in shape or size to not overlap any face-contacting portions of the mask body.

What is claimed is:

1. A disposable, flat-fold respirator having increased stiffness in selected areas, comprising:

a mask body that comprises a plurality of panels which may fold in towards each other and may unfold into a cup-shaped configuration, and first and second side tabs to which a harness is secured;

wherein the plurality of panels includes an upper panel, a lower panel, and a central panel, wherein the central panel is connected to the upper panel and lower panel, wherein the central panel is separated from the lower panel by a first line of demarcation and is separated from the upper panel by a second line of demarcation, and wherein the mask body comprises an upper panel stiffening layer located in the upper panel and having (i) a curved perimeter that closely matches the second line of demarcation; and (ii) a second perimeter that extends between the first and second side tabs; and wherein the respirator further comprises a nose clip or a nose foam and wherein the second perimeter of the upper panel stiffening layer is shaped to avoid the nose clip or nose foam.

2. The respirator of claim 1, wherein the upper panel and lower panel are configured to fold in towards the central panel to put the respirator into a closed configuration, and wherein the upper panel and lower panel are configured to unfold away from the central panel to put the respirator into an open configuration.

3. The respirator of claim 1, wherein the lower panel includes an outer perimeter and a lower panel stiffening later, and the lower panel stiffening layer includes an outer perimeter, wherein the outer perimeter of the lower panel stiffening layer corresponds to the outer perimeter of the lower panel.

4. The respirator of claim 1, wherein the upper panel stiffening layer comprises open mesh like structures or fibrous webs made of polymers.

5. The respirator of claim 1, wherein the upper panel stiffening layer comprises polyolefins.

6. The respirator of claim 1, wherein the upper panel stiffening layer comprises materials that resist heat and humid environments.

7. The respirator of claim 1 further comprising a graspable tab extending from the lower panel, wherein the graspable tab assists the user in pulling the panels from a folded condition to open the mask body from the folded configuration into an open ready-to-use configuration.

8. A disposable, flat-fold respirator having increased stiffness in selected areas, comprising:

a mask body that comprises a plurality of panels which may fold in towards each other and may unfold into a cup shaped configuration, and first and second side tabs to which a harness is secured;

wherein the plurality of panels includes an upper panel, a lower panel, and a central panel, wherein the central panel is connected to the upper panel and lower panel, wherein the central panel is separated from the lower panel by a first line of demarcation and is separated from the upper panel by a second line of demarcation, and wherein the mask body comprises an upper panel stiffening layer located in the upper panel and having (i) a curved perimeter that closely matches the second line of demarcation; and (ii) a second perimeter that extends between the first and second side tabs, wherein the mask body comprises a lower panel stiffening layer and located in the lower panel and having (i) a curved perimeter that closely matches the first line of demarcation; and (ii) a second perimeter that extends between the first and second side tabs; and wherein the second perimeter of the upper panel stiffening layer and the second perimeter of the lower panel stiffening layer are configured in shape or size to not overlap any face-contacting portions of the mask body.

9. The respirator of claim 8, wherein the upper panel stiffening layer and the lower panel stiffening layer comprising materials that resist heat and humid environments.

* * * * *